(No Model.)

J. BOND.
MECHANISM FOR CONTROLLING THE FRICTION CLUTCH IN THE HEADSTOCK OF SPINNING MULES.

No. 467,532. Patented Jan. 26, 1892.

WITNESSES:
T. R. Welles
M. L. Vankirk

INVENTOR
John Bond.
BY
F. T. Warner
his — ATTORNEY.

UNITED STATES PATENT OFFICE.

JOHN BOND, OF WATERLOO, NEW YORK.

MECHANISM FOR CONTROLLING THE FRICTION-CLUTCH IN THE HEAD-STOCK OF SPINNING-MULES.

SPECIFICATION forming part of Letters Patent No. 467,532, dated January 26, 1892.

Application filed July 27, 1891. Serial No. 400,778. (No model.)

*To all whom it may concern:*

Be it known that I, JOHN BOND, a citizen of the United States, and a resident of Waterloo, in the county of Seneca and State of New York, have invented certain new and useful Improvements in Mechanism for Controlling the Friction-Clutches in the Head-Stocks of Spinning-Mules, of which the following is a specification.

My invention relates to the means employed for controlling the engagement of the parts constituting the friction-clutch arranged in the head-stock of self-operating spinning mules or jacks. My purpose is to reduce the violence with which the sliding member of this clutch meets or engages the friction-pulley, thus preventing a sudden shock to the reversing-gearing and other parts of the machinery affected by it. This advantage, together with others resulting therefrom, to all of which I will more fully refer hereinafter, I gain by means of the novel features of construction and combination of parts shown in the accompanying drawings, in which—

Figure 1:
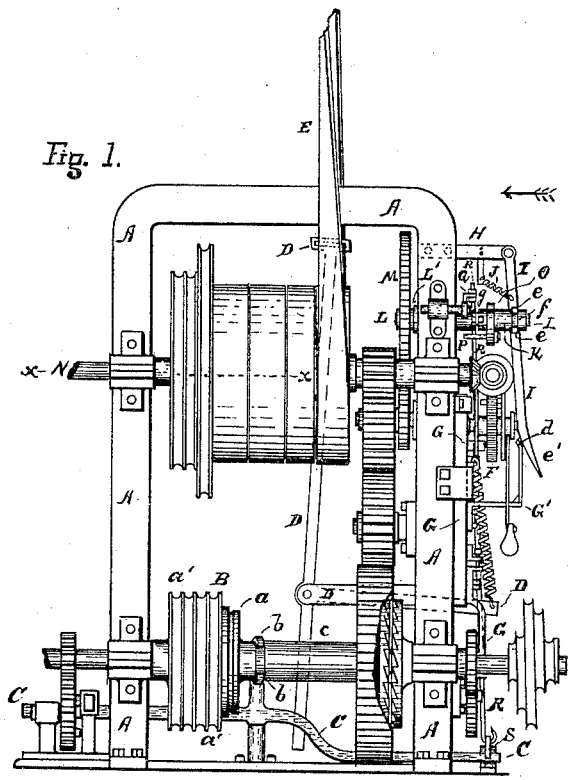
Figure 2:
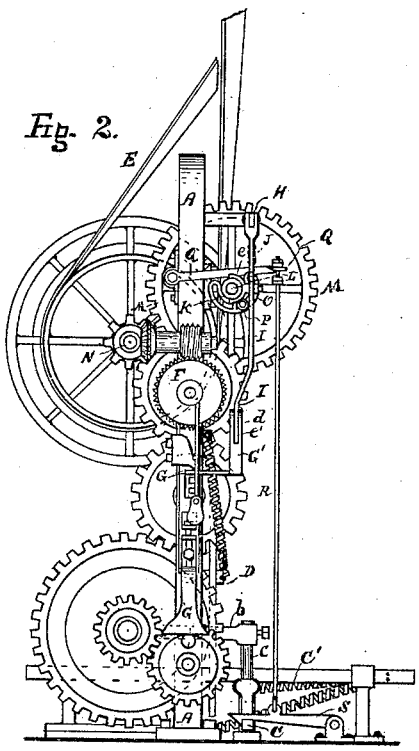
Figure 3:
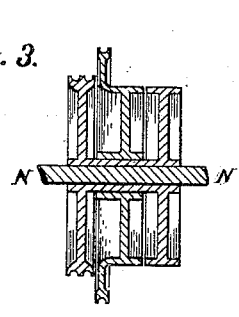
Figure 4:
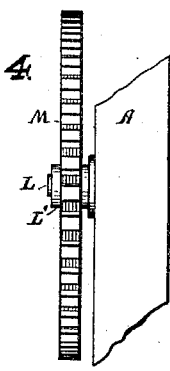
Figure 5:
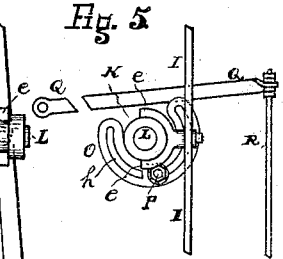

Figure 1 is a back elevation of so much of the head-stock of a spinning-mule as will suffice to show the connection of my improvements therewith. Fig. 2 is an end elevation of the parts shown in Fig. 1, viewed in the direction indicated by the arrow there shown. Fig. 3 is a section in the plane of the line $xx$ of Fig. 1. Fig. 4 is a detail, enlarged, showing more plainly the means employed for actuating the cam which frees the friction-lever; and Fig. 5 is also a detail, enlarged, showing more clearly the said cam and some of the parts operating immediately in connection therewith.

Like letters of reference indicate like parts.

Heretofore this clutch has been made alternately operative and inoperative by means of a lever controlled in part by contact with the twist-slide. This method of governing the said clutch has resulted in the engagement of its sliding member with the clutch-pulley or other member before the driving-belt was completely shifted and while therefore these members were rotating in reverse directions, thus causing a harsh action of the machinery, with consequent bad effects upon it as well as upon the work being done. I will also here state that, with the exceptions hereinafter explained, the twist-gear, twist-slide, and drive-belt shifter operate together and are actuated substantially as heretofore. While I have quite fully shown many parts of the head-stock, the construction, arrangement, and operation of which are old and well known, I have only done so for the purpose of illustrating the nature and purpose of my improvements in connection therewith, and if a more full explanation be needed reference may be had to the so-called Davis and Furber "self-operating" mules and jacks, the construction and operation of which are known to those familiar with machinery of this class.

A represents the frame of the machine.

B is the friction-clutch, of which $a$ is the sliding member and $a'$ the friction-pulley or other member.

C is the lever which directly actuates the part $a$, $b$ being the arm or fork forming a part of said lever and engaging the rotary and sliding sleeve $c$, on which the part $a$ is rigidly mounted.

D is the drive-belt shifter, and E the drive-belt.

F is the twist-gear, and G the twist-slide, to which latter an arm G′, having a bent or beveled upper end $d$, is applied.

H is an arm extending from the frame. I is a lever pivoted to the said arm, and J is a spring connecting the said lever to the said arm. The lever I has a forked extension $e$ and a bent or beveled lower end $e'$ arranged to meet the upper end of the arm G′, as is clearly shown in Fig. 1. The fork of the extension $e$ enters an annular groove $f$ in a sleeve K, mounted on a shaft L; also, mounted on the shaft L is a sleeve L′, rotated by a gear M in gear with the "pulling-in" gear.

The adjacent or meeting ends of the sleeve K and sleeve L′, are toothed or notched, as is clearly shown at $g$, Fig. 4, to effect a clutch engagement when the said sleeves meet, as will be hereinafter more fully explained.

O is a plate or flange rigidly applied to the sleeve K and having therein a slot $h$, in which a pin P is adjustably clamped. This flange and pin, as will be perceived hereinafter, perform the function of a rotary cam.

Q is a lever pivoted at one end to the frame and extending across the path or field in which the pin P moves. Connected to the outer or free end of the lever Q is a rod, wire, or cord R, connected to a hook or catch S, which, when in its lowest position, engages the lever C, as is clearly shown in Fig. 2, so as to render the friction-clutch temporarily inoperative.

The engagement of the member $a$ of the friction-clutch B with the friction-pulley $a'$ is produced as follows: When the twist-slide drops, it carries with it the arm G', thus releasing the lower end of the lever I, which is then drawn in by the spring J. This movement of the said lever to which the fork $e$ is attached carries the sleeve K, which so far has been idle, into engagement with the sleeve L', which is then rotating. A rotary movement is therefore communicated to the cam O, and during this rotation the pin P strikes and lifts the lever Q, thus drawing up the rod, wire, or cord R and lifting the hook or catch S from its engagement with one end of the lever C, the spring C', Fig. 2, of which then moves the opposite end of the said lever in such a direction as to carry its arm $b$ toward the pulley $a'$, thus bringing the member $a$ of the friction-clutch into operative engagement with the said pulley and reversing the direction of its rotation. It is to be understood that prior to this the belt E has been shifted as usual. It will be perceived, therefore, that while the pin P is moving toward the lever Q an interval of time occurs between the initial movement of the belt and the release of the lever C, and this interval is sufficient to permit the complete shifting of the belt and allow the pulley $a'$ practically, if not entirely, to cease its rotation. This interval or intermission may be varied or controlled by adjusting the pin P accordingly in the slot $h$. When the twist-slide moves up, the sleeve K is moved out of engagement with the sleeve L', the pin P falls away from the lever Q, and the hook or catch S falls into engagement with the lever C, which latter is returned to that position, as heretofore. It will now be perceived that the member $a$ of the clutch B will move easily, but positively, into engagement with the pulley $a'$, and hence that all the parts of the machinery will run smoothly and evenly, with consequent good results not only to the gearing, but also to the work being done. There is also no unnecessary exertion or loss of power.

While I have shown my improvements in connection with a spinning-mule of the class referred to, I will state that they may also be applied with advantage to spinning-jacks, a corresponding modification being made in the arrangement or location of the parts.

These improvements may also be applied to mules and jacks for spinning cotton.

Having thus described my invention, what I claim as new, and desire to secure by Letters Patent, is—

1. The combination, with the friction-clutch lever of the head-stock of a spinning-machine, of an intermittingly-rotative cam, a sliding sleeve carrying said cam, the twist-slide, an arm extending from said slide, a laterally-swinging lever engaging said sleeve and extending to said arm, a vertically-swinging lever arranged to be struck by said cam, and a catch in connection with said last-named lever and arranged for engagement with the clutch-lever, substantially as and for the purposes specified.

2. The combination, in the head-stock of a spinning-machine, of a cam, the sliding sleeve K, the shaft L, the sleeve L', the gear M, the drawing-in gear, a laterally-swinging lever engaging the sleeve K, the twist-slide, the catch S, the friction-clutch lever, and a vertically vibrating lever arranged to be struck by said cam and in connection with said catch, the meeting ends of said sleeves being adapted for clutch engagement with each other, substantially as and for the purposes specified.

3. In the head-stock of a spinning-machine and as means employed for holding out the friction-clutch therein, the combination of the twist-slide, the friction-clutch lever, the catch S, the levers I and Q, the latter in connection with the said catch, and an intermittingly-rotative cam arranged for acting on the lever Q, substantially as and for the purposes specified.

Signed at Waterloo, in the county of Seneca and State of New York, this 22d day of July, A. D. 1891.

JOHN BOND.

Witnesses:
 EVAN LEWIS,
 LOUIS BIRCH.